Dec. 11, 1945. J. H. HILL 2,390,837
WELDING ROD HOLDER
Filed Aug. 22, 1944 3 Sheets-Sheet 2
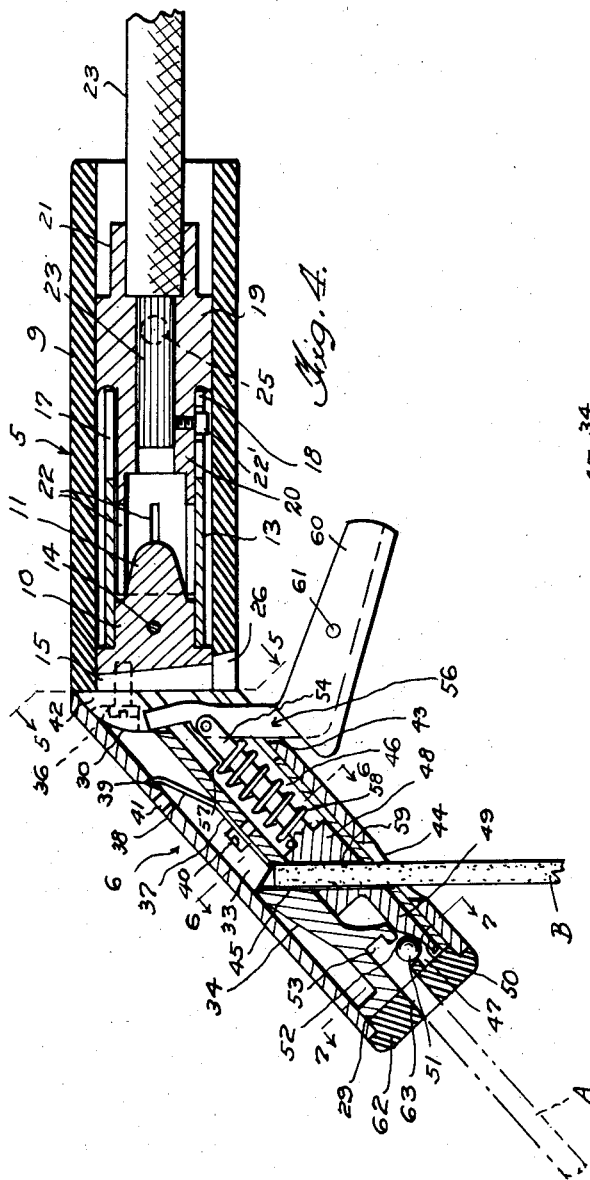
Inventor
JAMES H. HILL,
By *Clarence A. O'Brien
and Harvey B. Jacobson*
Attorneys

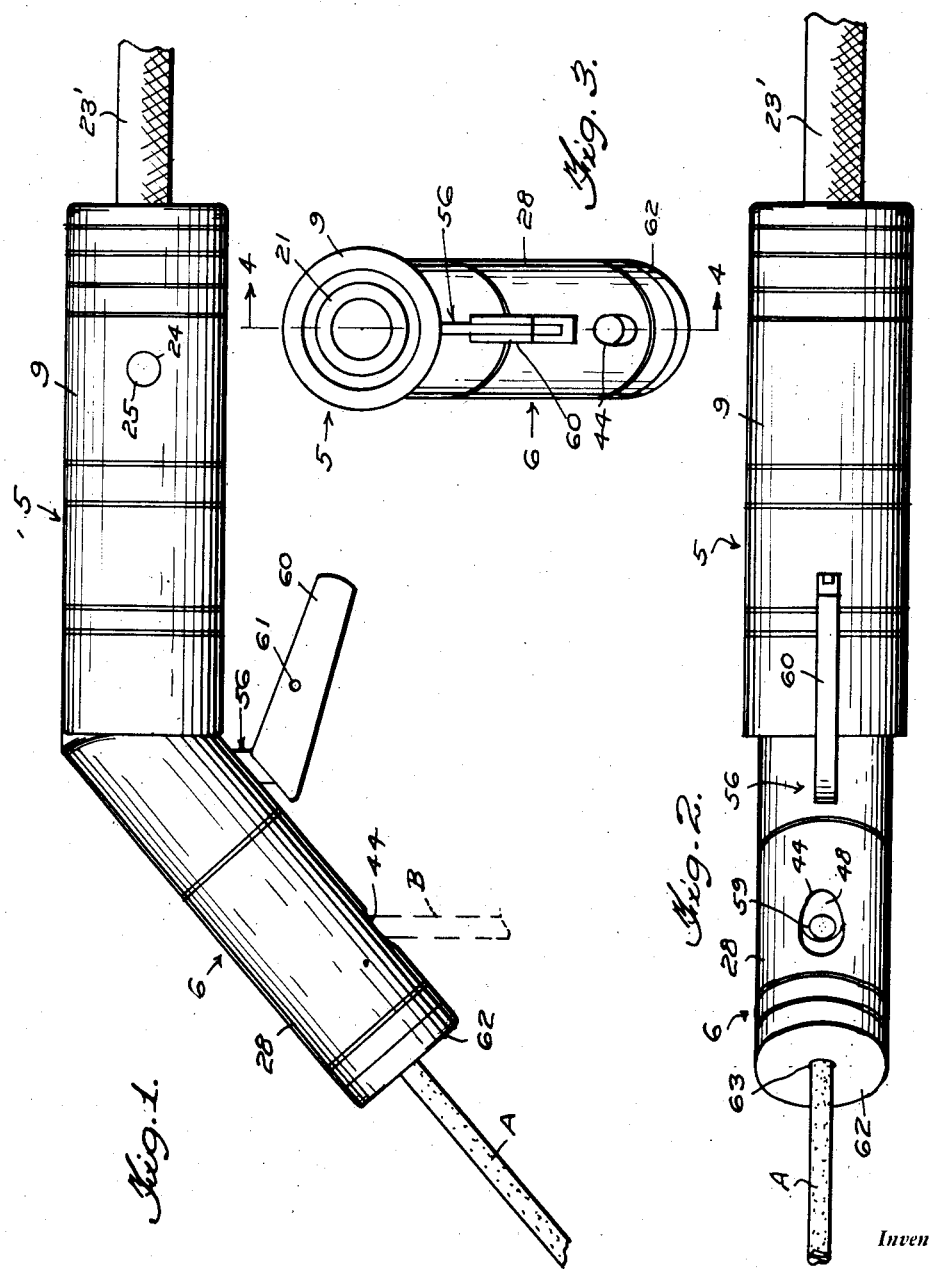

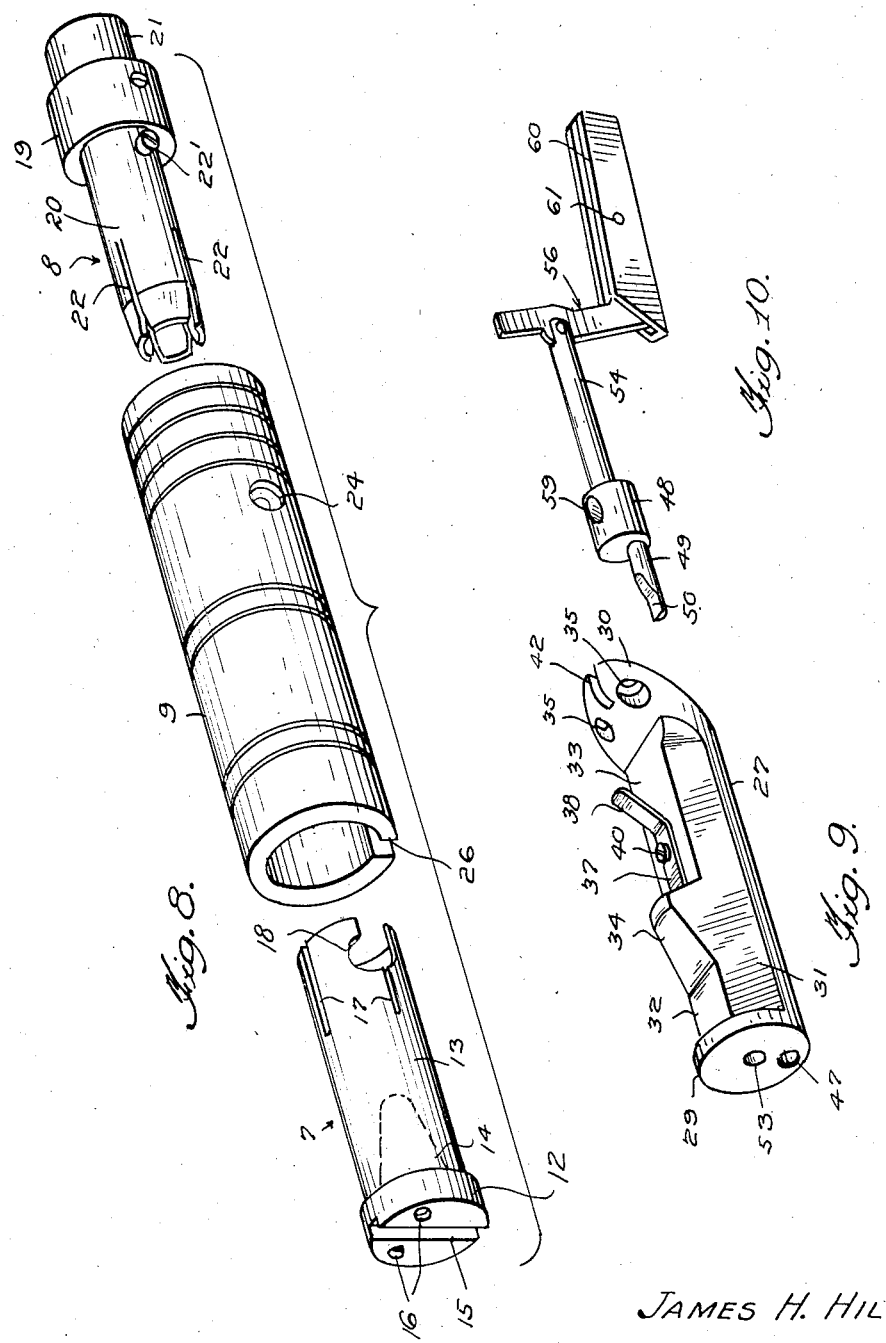

Patented Dec. 11, 1945

2,390,837

UNITED STATES PATENT OFFICE 2,390,837

WELDING ROD HOLDER

James H. Hill, Long Beach, Calif., assignor of forty-nine per cent to Howard F. Craven, Long Beach, Calif.

Application August 22, 1944, Serial No. 550,585

3 Claims. (Cl. 219—8)

This invention relates to new and useful improvements in welding rod holders, and the principal object of the present invention is to generally simplify and improve the construction of the welding rod holder disclosed in my U. S. Letters Patent No. 2,356,054, dated August 15, 1944.

Specifically, the present invention aims to provide a welding rod holder of the above kind which is so constructed as to facilitate and reduce the cost of manufacture and assembly of the parts.

Another object of the invention is to provide a welding rod holder which is of simple and durable construction, easy to assemble or take apart for repair, and highly efficient in use.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a side elevational view of a welding rod holder constructed in accordance with the present invention.

Figure 2 is a bottom plan view thereof.

Figure 3 is an end elevation looking toward the left of Figure 1 and with the conductor cable omitted.

Figure 4 is a central longitudinal section taken on line 4—4 of Figure 3.

Figure 5 is a transverse section taken on line 5—5 of Figure 4.

Figure 6 is a transverse section taken on line 6—6 of Figure 4.

Figure 7 is a transverse section taken on line 7—7 of Figure 4.

Figure 8 is a developed perspective view illustrating parts of the holder in position for assembly.

Figure 9 is a perspective view of the nose section of the body of the welding rod holder.

Figure 10 is a perspective view of the trigger and the movable clamp element actuated thereby.

Referring in detail to the drawings, the present welding rod holder includes a handle portion 5 and a nose portion 6 disposed at an obtuse angle to said handle portion 5. The handle portion 5 includes a body composed of separable sections 7 and 8, and a hand grip consisting of an insulating sleeve 9 fitted and secured over and completely enclosing the body 7, 8. The body section 7 consists of a cylindrical plug 10 having a tapered inner end portion 11 and provided with a circular head 12 at its outer end, and a metallic sleeve 13 having its forward end fitted on the plug 10 and secured thereon by suitable means such as a cross pin 14. The head 12 is provided at its outer side with a diametric kerf 15 and is formed at opposite sides of said kerf with threaded sockets 16 for a purpose which will later become apparent. The inner end of the sleeve 13 is divided into a plurality of resilient sections by means of a plurality of equally spaced longitudinal slots 17, and at the inner portion of one of said slots is cut away to provide a bayonet slot 18. The body section 8 consists of a tubular member having a portion 19 near one end of a size to snugly fit within the grip 9, and reduced end portions 20 and 21. The reduced inner end portion 20 is the longer and has its outer end portion divided into a plurality of resilient sections by means of a plurality of equally spaced longitudinal slots 22. The end portion 20 is adapted to snugly slidably fit within the sleeve 13 of the body section 7, and the arrangement is such that the tapered end 11 of plug 10 will enter the outer end of the end portion 20 so as to expand its resilient sections into snug engagement with the inner surface of the sleeve 13. Connection of the body sections 7 and 8 with each other is further and more positively effected by providing the section 8 with a pin or screw head 22' at one side of the end portion 20 which is arranged to enter the bayonet slot 18 and to finally occupy a position within the laterally extending end of said bayonet slot 18 upon rotating the section 8 relative to section 7. The intermediate portion of body section 8 has a bore portion of a diameter to snugly receive the end of the conductor cable 23 from which the insulation 23' has been stripped, and this end of the cable may be secured in this bore portion in any suitable way. The outer end portion 21 has its bore portion enlarged to receive the adjacent end of the insulation 23', and the insulating grip or sleeve 9 is of a length to extend outwardly beyond the outer end of body section 8, thus completely preventing any contact of the hand of the operator with charged metallic parts of the holder. The hand grip or sleeve 9 has an opening at 24 adapted to receive a set screw by means of which it may be secured in place upon the body section 8 as indicated by dotted lines at 25 in Figure 4. The hand grip or sleeve 9 is provided at the bottom of its forward end with a notch 26 for a purpose which will later become apparent.

The nose portion 6 includes an elongated body 27 having an insulating sleeve 28 fitted over and completely enclosing the same from end to end, said body 27 having circular end portions 29 and 30 which snugly fit within the bore of the sleeve 28 at opposite ends of the latter. The inner end 30 of the body 27 has its inner face disposed at an oblique angle to the longitudinal axis of said body 27 and in flat abutting relation to the adjacent end face of the head 12 of body section 7, the inner end of sleeve 28 also abutting the outer or adjacent end of hand grip or sleeve 9. The body 27 is reduced or beveled at opposite sides between the end portions 29 and 30, as at 31, and also has spaced portions thereof cut away at the top, as at 32 and 33. This provides a lug 34 at the top of the body 27 between the cut-away portions 32 and 33, and exposes the upper portion of the end 30 at the outer side of the latter. This exposed portion of the end 30 is formed with openings 35 to receive screws 36 that are threaded into the sockets 16 of body section 7 to rigidly connect the body 27 to said body section 7. Also, by cutting the body 27 away at 33, said body 27 is provided at the upper rear portion with a flat shoulder or surface on which is secured a spring catch 37 having an upwardly and inwardly inclined free end portion 38 arranged to engage in a notch 39 provided in the inner surface of the sleeve 28, to releasably lock the insulating sleeve 28 in place upon the body 27. A screw 40 may be used to fasten the catch 37 in place, and the sleeve 28 is provided with an opening 41 in registry with the inclined end portion 38 of the catch 37 so that a slender tool may be inserted to depress said end portion 38 of catch 37 for releasing it from the notch 39 when it is desired to remove the sleeve 28 for renewal or repair of parts. At its inner end, the body 27 is formed with a diametric kerf 42 registered with the kerf 15 in the head 12 of body section 7. Sleeve 28 is formed at the under side of its inner end portion with a slot or recess 43 aligned with the kerf 42. In addition, the sleeve 28 has an opening 44 in the under side of its outer end portion which registers with an oblique opening 45 provided through the intermediate portion of body 27 and its lug 34.

The body 27 of the nose portion has a longitudinally extending bore through the lower part thereof including a relatively large rear bore portion 46 and a smaller eccentric forward or outer bore portion 47. A clamp element is slidable in the body 27 and includes a head 48 fitting in the bore portion 46 and having a reduced extension 49 at its outer end fitting in the bore portion 47. The reduced extension 49 has a sloping upper surface 50 at its outer end on which rests a ball 51 movable in a transverse opening 52 of the body 27. Opening 52 communicates with an axial socket 53 provided in the outer end of body 27. Fixed to and projecting rearwardly from the head 48 of the clamp element is an elongated stem or rod 54 whose rear or inner end is pivoted at 55 to the intermediate portion of one arm of an angular trigger 56. The free end of this arm of trigger 56 engages in the kerf 42 of body 27 so as to fulcrum on the front wall of said kerf 42, the mentioned arm of trigger 56 projecting outwardly through the slot or recess 43 of the sleeve 28. The other arm of trigger 56 projects rearwardly below the handle portion 5 at the forward or outer end of the latter, and it will be apparent that when the outer arm of trigger 56 is pressed upwardly toward the handle portion 5, the rod 54 is pulled rearwardly or inwardly so as to rearwardly slide the clamp element. A shoulder 57 is provided at the rear of the bore portion 46, and this shoulder is engaged by the rear or inner end of a helical compression spring 58 that encircles the stem 54 and abuts the head 48 at its outer or forward end. Thus, the clamp element is spring projected and manually retractible. When the trigger 56 is operated to retract the clamp element, the inner or upwardly extending arm of said trigger is allowed to move rearwardly from recess 43 into recess 26 of sleeve 9, as well as into the adjacent portion of the kerf 15 of the head 12 of body section 7. The head 48 of the clamp element has an oblique opening 59 therethrough which is adapted to register with the opening 45 of body 27 when the clamp element is slightly retracted against the action of spring 58. When the openings 45 and 59 are aligned, they are adapted to receive the end portion of a relatively large gauge welding rod B, and when the trigger is subsequently released, the spring 58 urges the clamping element forward so that this end of the welding rod is securely held. Also, the arrangement is such that when the clamping element is retracted, the ball 51 is allowed to lower, thereby permitting the insertion of an end of a small gauge welding rod A in the socket 53. Subsequent release of the trigger will allow spring 58 to force the clamping element forwardly or outwardly so that the inclined surface 50 of the extension 49 causes elevation of ball 51 into binding engagement with the rod A so as to secure the same in place. Obviously, these welding rod securing devices may be selectively employed. The outer or rearwardly projecting arm of trigger 56 is received within a longitudinally folded or channel-shaped insulating handle 60 fastened to the arm of the trigger in any suitable way, such as by riveting at 61. As the body sections 7 and 8 and the body 27, as well as the clamping element, are of proper metal, they act to effectively conduct the current from cable end 23 to the welding rod being clamped in the holder. The forward or outer end of sleeve 28 preferably projects slightly beyond the outer end of body 27 and has a suitable insulating plug 62 fitted and secured therein, said plug having a central opening 63 registered with the axial socket 53 in the outer end of the body 27 so that the welding rod A may be passed therethrough and inserted in said socket 53.

It will be apparent that the body sections 7 and 8 may be assembled, whereupon the hand grip sleeve 9 may be fitted and secured thereon. The body 27, together with the parts carried thereby, may then be secured to the body section 7, after which the sleeve 28 may be slipped onto the body 27 for being automatically locked in place by the catch 37. The device is then ready to use in the manner described, and it presents a durable and compact welding rod holder of a highly efficient kind. The shoulder 57 may be provided by a bushing snugly fitted in the inner end of the bore portion 46 after insertion of the clamping element 48, 49 in the body 27.

From the foregoing description, it is believed that the construction and operation, as well as the advantages of the present invention, will be readily understood and appreciated by those skilled in the art. Minor changes in details of construction illustrated and described are contemplated, such as fairly fall within the spirit and scope of the invention as claimed.

What I claim is:

1. A welding rod holder comprising elongated nose and handle portions disposed at an obtuse angle to each other and each including a conducting body having an insulating sleeve fitted and secured thereover, the inner ends of the body and insulating sleeve of the nose portion being oblique to the longitudinal axes thereof and respectively abutting the outer ends of the body and the insulating sleeve of the handle portion, means rigidly securing the adjacent ends of the bodies together, means to secure the end of a conductor cable to the inner end of the body of the handle portion, and a spring-engaged and trigger-released welding rod clamping means carried by the body of said nose portion and including a clamping element slidable longitudinally of and within the last-named body, the body of the nose portion having a kerf in the inner end thereof, an angular trigger having an arm extending into and bearing at its free end against the outer wall of said kerf, and a rod projecting rearwardly from said clamping element and pivoted to the intermediate portion of said arm of the trigger.

2. A welding rod holder comprising elongated nose and handle portions disposed at an obtuse angle to each other and each including a conducting body having an insulating sleeve fitted and secured thereover, the inner ends of the body and insulating sleeve of the nose portion being oblique to the longitudinal axes thereof and respectively abutting the outer ends of the body and the insulating sleeve of the handle portion, means rigidly securing the adjacent ends of the bodies together, means to secure the end of a conductor cable to the inner end of the body of the handle portion, and a spring-engaged and trigger-released welding rod clamping means carried by the body of said nose portion and including a clamping element slidable longitudinally of and within the last-named body, the body of the nose portion having a kerf in the inner end thereof, an angular trigger having an arm extending into and bearing at its free end against the outer wall of said kerf, and a rod projecting rearwardly from said clamping element and pivoted to the intermediate portion of said arm of the trigger, the outer end of the inner body section being slit longitudinally to define resilient portions, the outer body section having an internal tapered member arranged to enter the split end portion of the inner body section so as to expand the same as the body sections are telescoped.

3. A welding rod holder comprising elongated nose and handle portions disposed at an obtuse angle to each other and each including a conducting body having an insulating sleeve fitted and secured thereover, the inner ends of the body and insulating sleeve of the nose portion being oblique to the longitudinal axes thereof and respectively abutting the outer ends of the body and the insulating sleeve of the handle portion, means rigidly securing the adjacent ends of the bodies together, means to secure the end of a conductor cable to the inner end of the body of the handle portion, and a spring-engaged and trigger-released welding rod clamping means carried by the body of said nose portion and including a clamping element slidable longitudinally of and within the last-named body, the body of the nose portion having a kerf in the inner end thereof, an angular trigger having an arm extending into and bearing at its free end against the outer wall of said kerf, and a rod projecting rearwardly from said clamping element and pivoted to the intermediate portion of said arm of the trigger, the outer end of the body of said handle portion also having a kerf therein registered with the kerf in the body of the nose portion, and the insulating sleeve of said handle portion having a recess in its outer end registered with the last-named kerf, said arm of the trigger being movable into the kerf and recess of the body and insulating sleeve respectively of the handle portion when the trigger is actuated to release said clamping means.

JAMES H. HILL.